(12) United States Patent
Randall (10) Patent No.: US 6,957,904 B2
(45) Date of Patent: Oct. 25, 2005

(54) ILLUMINATION DEVICE UTILIZING DISPLACED RADIATION PATTERNS

(75) Inventor: Stephen Michael Randall, North St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 301 days.

(21) Appl. No.: 09/918,262

(22) Filed: Jul. 30, 2001

(65) Prior Publication Data

US 2003/0021122 A1 Jan. 30, 2003

(51) Int. Cl.[7] .............................. F21V 7/04; G02B 6/00; G09F 13/00
(52) U.S. Cl. ...................... 362/551; 362/552; 362/554; 362/555; 385/901
(58) Field of Search ................................. 362/557, 551, 362/552, 558, 237, 212, 320, 554, 555, 582, 26; 40/547; 385/901

(56) References Cited

U.S. PATENT DOCUMENTS

| | | | |
|---|---|---|---|
| 4,719,544 A | * | 1/1988 | Smith .......................... 362/104 |
| 4,826,273 A | | 5/1989 | Tinder et al. |
| 4,845,596 A | | 7/1989 | Mouissie |
| 5,058,985 A | | 10/1991 | Davenport et al. |
| 5,208,884 A | | 5/1993 | Groh et al. |
| 5,353,365 A | * | 10/1994 | Dumas et al. ............... 385/102 |

(Continued)

FOREIGN PATENT DOCUMENTS

| | | |
|---|---|---|
| EP | 0 361 742 A2 | 4/1990 |
| WO | WO 97 01728 | 1/1997 |
| WO | WO 00 33112 | 6/2000 |
| WO | WO 00 34813 | 6/2000 |
| WO | WO 00 63613 | 10/2000 |

OTHER PUBLICATIONS

Application Note 1149–5, "Secondary Optics Design Considerations for Super Flux LEDs," LumiLeds, A Philipe Lighting and Agilent Technologies Joint Venture, 2000.
Gary I. Peterson, "Lightpipe Design," Automotive Engineering International, A109.N2. p223, Feb. 2001.
Sumitomo 3M Technical Services Installation Bulletin, May 11, 2001 (Japanese Language and English Translation).

Primary Examiner—John Anthony Ward
Assistant Examiner—Jacob Y. Choi
(74) Attorney, Agent, or Firm—Stephen W. Buckingham (57) ABSTRACT

In one embodiment, the invention is directed to an illumination device. The illumination device includes a light emitting diode that emits a radiation pattern, wherein a maximum luminous intensity of the radiation pattern is displaced relative to a center axis of the light emitting diode. The illumination device may also include a number of light guides positioned to be illuminated by the light emitting diode. The invention utilizes the "batwing" radiation pattern of a light emitting diode to effectively illuminate a number of light guides with a single light emitting diode. Each light guide is offset from a center axis of the light emitting diode to capture light that is annularly displaced. This offset positioning of the light guides allows the light guides to effectively capture light from the light emitting diode where light intensity is greatest.

32 Claims, 4 Drawing Sheets

U.S. PATENT DOCUMENTS

| | | |
|---|---|---|
| 5,428,509 A | 6/1995 | Dassanayake |
| 5,432,876 A | 7/1995 | Appeldorn et al. |
| 5,548,676 A | 8/1996 | Savage, Jr. |
| 5,647,657 A * | 7/1997 | Damsky et al. ............... 362/32 |
| 5,677,972 A | 10/1997 | Popovich |
| 5,845,038 A | 12/1998 | Lundin et al. |
| 5,933,560 A | 8/1999 | Ishiharada et al. |
| 6,077,462 A | 6/2000 | Lundin et al. |
| 6,272,269 B1 | 8/2001 | Naum ......................... 385/43 |
| 6,302,570 B1 * | 10/2001 | Petell et al. ................ 362/554 |
| 6,305,813 B1 * | 10/2001 | Lekson et al. ................ 362/31 |
| 6,337,946 B1 * | 1/2002 | McGaffigan ................ 385/901 |
| 6,367,957 B1 * | 4/2002 | Hering et al. ............... 362/511 |
| 6,471,388 B1 * | 10/2002 | Marsh ........................ 362/559 |
| 6,595,674 B1 * | 7/2003 | Yoneda ...................... 362/555 |
| 6,607,286 B2 * | 8/2003 | West et al. .................. 362/255 |
| 6,612,730 B1 * | 9/2003 | Ikeda ......................... 362/558 |
| 6,623,132 B2 * | 9/2003 | Lekson et al. ................ 362/31 |
| 2002/0172478 A1 | 11/2002 | Sahlin |
| 2003/0021122 A1 | 1/2003 | Randall |

* cited by examiner

ILLUMINATION DEVICE UTILIZING DISPLACED RADIATION PATTERNS

FIELD

The invention relates to light guides for functional or decorative lighting and light sources having radiation patterns in which the maximum luminous intensity is displaced.

BACKGROUND

Light guides can be used to provide functional or decorative lighting. Functional lighting refers to lighting that is used for the purpose of illuminating an object or area to make the object or area more conspicuous. Decorative lighting refers to lighting that is used for aesthetic purposes. Often, light guides are used for both functional and decorative purposes.

A light source can be used to illuminate one or more light guides such that light is transmitted through the light guides via total internal reflection. Light guides may provide side lighting, in which light is emitted from the sides of the guides. In addition, light guides may provide end lighting, in which light is emitted from the end of the guides. A variety of different extraction techniques using notches or coating, for example, can be applied to the light guides to cause light to be emitted from the light guides in a controlled or random manner.

Lighting systems that implement light guides generally have a light source that illuminates the light guide. For example, incandescent light sources, florescent light sources, or light emitting diodes are often used to illuminate a light guide. The light source may reside in a light source assembly, also referred to as an illuminator. The light can be transmitted down the light guide, possibly changing colors or pulsating over time to provide the desired functional or decorative effect.

Light emitting diodes are particularly well suited for illuminating light guides because light emitting diodes are point-like light sources. Moreover, light emitting diodes use less energy than many other light source alternatives. Some light emitting diodes, however, have "batwing" radiation patterns in which the maximum luminous intensity of the light emitting diodes is angularly displaced. Therefore, conventional lighting systems that utilize light emitting diodes often utilize corrective optics to correct for the angular displacement of the radiation pattern and provide peak radiation intensity along a center axis of the light emitting diodes.

SUMMARY

The invention utilizes the "batwing" radiation pattern of a light emitting diode to effectively illuminate a number of light guides with a single light emitting diode. Each light guide is offset from a center axis of the light emitting diode to capture light that is annularly displaced. This offset positioning of the light guides allows the light guides to effectively capture light from the light emitting diode where light intensity is greatest.

In one embodiment, an illumination device includes a light emitting diode that emits a radiation pattern, wherein a maximum luminous intensity of the radiation pattern is displaced relative to a center axis of the light emitting diode. The illumination device may also include a number of light guides positioned to be illuminated by the light emitting diode. Each light guide can be positioned at offset locations relative to the center axis of the light emitting diode. For example, each light guide may be positioned such that a cross-sectional center of each light guide substantially corresponds to locations of the maximum luminous intensity of the radiation pattern of the light emitting diode. In this manner, a single light emitting diode can be used to illuminate a number of light guides in an effective manner.

The illumination device may also include a light guide fixture formed to mate with the light guides. The light guide fixture can be used to position the light guides at the offset locations relative to the center axis of the light emitting diode. For example, the light guide fixture may be positioned adjacent the light emitting diode and the light guides may be mated with the light guide fixture. In this manner, each light guide can be positioned such that a cross-sectional center of each light guide substantially corresponds to a location of the maximum luminous intensity of the radiation pattern of the light emitting diode. In some embodiments, the light guide fixture forms a housing that houses the light emitting diode.

In another embodiment, the invention is directed toward a sign. The sign may include a frame, and a light emitting diode that emits a radiation pattern, wherein a maximum luminous intensity of the radiation pattern is displaced relative to a center axis of the light emitting diode. The light emitting diode may be housed within the frame. The sign may also include a number of light guides positioned to be illuminated by the light emitting diode, and each light guide can be positioned at an offset location relative to the center axis of the light emitting diode. The frame can be formed with holes and each light guide may protrude through at least one of the holes.

In still another embodiment, the invention is directed toward a method. The method may include positioning a number of light guides next to a light emitting diode that emits a radiation pattern, wherein a maximum luminous intensity of the radiation pattern is displaced relative to a center axis of the light emitting diode. Each light guide can be positioned at an offset location relative to the center axis of the light emitting diode. The method may also include illuminating the light guides with the light emitting diode. In this manner, the light emitting diode can be used to effectively and efficiently illuminate a number of light guides.

The invention is capable of providing several advantages. For example, the use of light emitting diodes as opposed to other light sources can reduce power consumption. Moreover, light emitting diodes can be more reliable than other light source alternatives. In addition, light emitting diodes generally have longer lifespans than other light source alternatives. Power can also be saved by illuminating a number of light guides with a single light emitting diode according to the invention.

The invention can also produce more uniform lighting in the number of light guides that are illuminated by the same light emitting diode. Intensity variation between different light emitting diodes can be relatively large. Indeed, some light emitting diodes are sold at higher costs when the amount of acceptable variation in light output between different light emitting diodes is minimized. The invention, however, can utilize the same light emitting diode to illuminate a number of light guides in a substantially uniform manner. Thus, even the relatively lower cost light emitting diodes can be used to illuminate multiple light guides in a substantially uniform manner.

Another advantage of the invention is the avoidance of corrective optics. As mentioned above, conventional teaching has viewed angular displacement of peak radiation intensity as a problem requiring the use of corrective optics. The invention, however, utilizes and exploits angular displacement of peak radiation intensity as a benefit that improves the way in which a number of light guides are illuminated by the same light emitting diode. In this manner, the invention can provide both an improved lighting system, and also a lighting system having fewer optical elements than conventional systems that utilize corrective optics to compensate for the angular displacement of peak radiation intensity.

Still another advantage can be realized by using light guides that provide directional side lighting. Each of the light guides that are illuminated by the single light emitting diode can direct light in different directions. This can be especially advantageous for use with signs that are positioned for viewing by persons close to the sign and other persons far away from the sign. The use of a single light emitting diode to illuminate two light guides can ensure that the light guides are illuminated substantially uniformly. The two different light guides may provide directional lighting in different directions. If used in a sign, for example, the first light guide may direct light downward, toward persons close to the sign, and the second light guide may direct light outward, toward persons a significant distance from the sign.

Additional details of these and other embodiments are set forth in the accompanying drawings and the description below. Other features, objects and advantages will become apparent from the description and drawings, and from the claims.

DETAILED DESCRIPTION

In general, the invention provides an illumination device for providing effective and efficient lighting. The illumination device can be implemented in any number of different applications to provide uniform lighting via a number of light guides illuminated by the same light emitting diode. The invention utilizes the "batwing" radiation pattern of the light emitting diode to facilitate and improve illumination of the number of light guides. Each light guide is offset from a center axis of the light emitting diode to capture light that is angularly displaced. This offset positioning of the light guides allows the light guides to effectively capture light from the light emitting diode where light intensity may be greatest. In one particular application, the invention is implemented in a sign. However, the invention could be used in any application where lighting is desirable.

Figure 1:
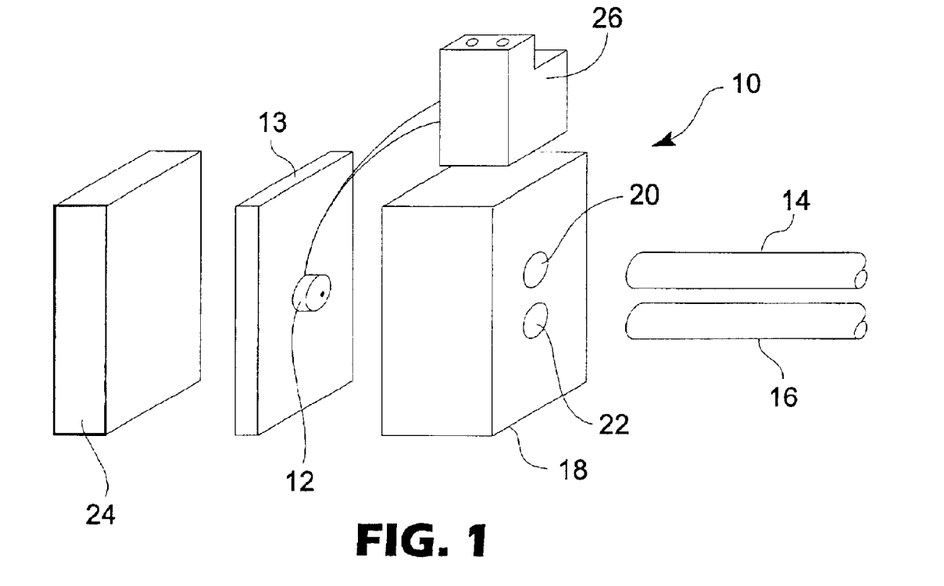
FIG. 1 is a perspective exploded view of an illumination device according to the invention.
Figure 2:
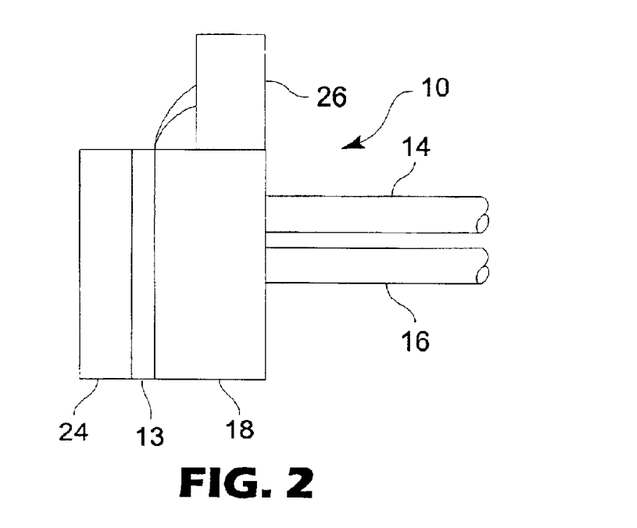
FIG. 2 is a side-view of an illumination device as shown in FIG. 1.

FIG. 1 is a perspective exploded view of an illumination device 10 according to the invention. FIG. 2 is a side view of the assembled illumination device 10. Illumination device 10 includes a light emitting diode 12 and a number of light guides. A first light guide 14 and a second light guide 16 are shown for illustrative purposes. However, any number of light guides could be used according to the invention. Indeed, even a single light guide could be used. Suitable light guides, for example, as described in U.S. Pat. No. 5,845,038 are commercially available from Minnesota Mining and Manufacturing Company of St. Paul, Minn. Other light guides could also be used, including light guides having any particular cross-sectional shape. For example, light guides having cross-sectional shapes that are square, rectangular, polygonal, circular, or any other shape could be used in accordance with the invention.

Illumination device 10 may also include a light guide fixture 18 formed with holes 20, 22 for mating with light guides 14 and 16. For example, light guide fixture 18 can be used to properly position light guides 14 and 16 relative to light emitting diode 12. Illumination device 10 may also include heat sink 24 to dissipate heat away from light emitting diode 12, and a connector 26 coupled to light emitting diode 12. For example, connector 26 may be used to connect light emitting diode 12 to a power supply (not shown). Light emitting diode 12 may reside on plate 13, although the invention is not limited in that respect.

Light emitting diode 12 is a light emitting diode having a "batwing" radiation pattern, in which the maximum luminous intensity of the light emitting diode is angularly displaced. Luminous intensity refers to the flux density of light emitted from light emitting diode 12 at a position in space. The radiation pattern of a light emitting diode describes how the flux is distributed in space. The radiation pattern can be described by defining the intensity of the light emitting diode as a function of angle from the center axis of the light emitting diode, i.e., an optical axis extending outward from the center of the light emitting diode. A suitable light emitting diode, for example, is the Luxeon™ Star/C available from LumiLeds of San Jose, Calif.

Figure 3:
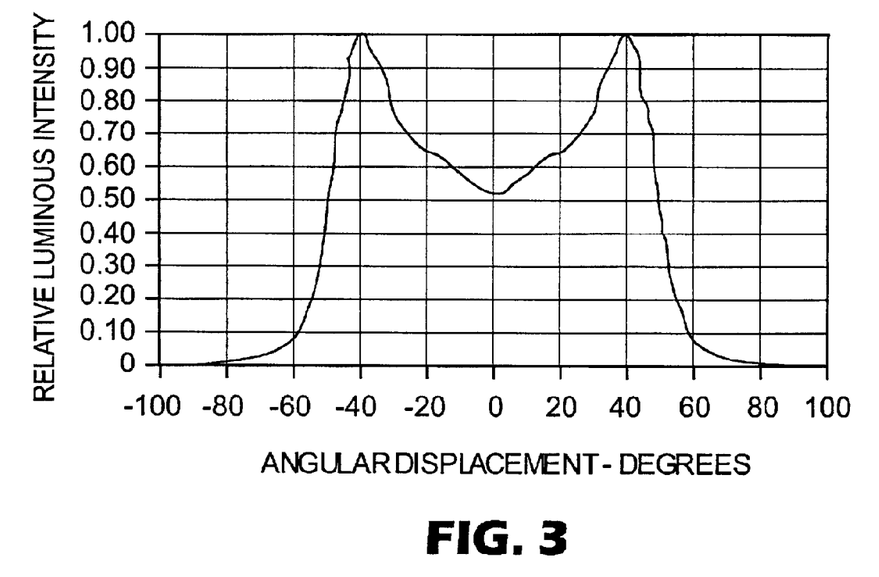
FIG. 3 is a graph illustrating a typical "batwing" radiation pattern of a light emitting diode that can be used in accordance with the invention.

FIG. 3 is a graph illustrating a typical "batwing" radiation pattern of a light emitting diode that can be used in accordance with the invention. The graph shows the relative luminous intensity as a function of angular displacement. The graph also illustrates where the term "batwing" radiation pattern comes from, i.e. the shape of the curve resembles batwings. Consequently, the maximum luminous intensity of light emitted from light emitting diode 12 occurs at locations that are offset from the center axis. In other words, as shown in FIG. 3, the peaks that define the maximum luminous intensity occur at a defined angle relative to the center axis. Depending on the particular light emitting diode, the maximum luminous intensity may occur at different angles. In FIG. 3, the maximum luminous intensity occurs at approximately 40 degrees from the center axis. In general, the angle that defines the maximum luminous intensity is referred to herein as the peak luminous intensity angle.

In many of the exemplary embodiments described below, the maximum luminous intensity angle is assumed to be substantially rotationally symmetric around the center axis of the light emitting diode. However, the invention may also be implemented with light emitting diodes having non-symmetric maximum luminous intensity angles. For example, light emitting diodes may have a number of different maximum luminous intensity angles, or the maximum luminous intensity angle may be different in different directions. In general, however, the invention is most effective for use with light emitting diodes having at least one local maximum intensity angle that is off center.

If the maximum luminous intensity angle is rotationally symmetric around the center axis of the light emitting diode, the angular displacement of the maximum luminous intensity can be described as three dimensionally symmetric. In other words, for a light emitting diode like that graphed in FIG. 3, the maximum luminous intensity may occur at every location that is 40 degrees from the center axis. Thus, a three dimensional graph of the maximum luminous intensity angle would appear cone-shaped. Of course, as you move further away from the light emitting diode, the peak intensity also decreases. The maximum luminous intensity along any plane parallel to the light emitting diode graphed in FIG. 3, however, always occurs at approximately 40 degrees from center.

Angularly displaced maximum luminous intensity is conventionally regarded as a problem. Often, corrective optics are used to correct for this perceived problem. The corrective optics typically redistribute the light to produce a radiation pattern that has a peak at or near the center axis.

In accordance with the invention, however, the "batwing" radiation pattern or angularly displaced maximum luminous intensity is utilized and exploited to provide advantages for an illumination device. In particular, the illumination device may have a simpler construction than more conventional illumination devices. For example, one or more light guides may be positioned such that the cross-sectional centers of the light guides are positioned substantially along the peak luminous intensity angle. This construction can allow the light guides to effectively capture as much light as possible without the use of corrective optics.

Referring again to FIGS. 1 and 2, light guide fixture 18 can be used to position light guides 14, 16 such that the cross-sectional centers of the light guides are positioned substantially along the peak luminous intensity angle. Light guide fixture 18, for example, can be a machined piece of metal or a formed piece of plastic. Light guide fixture 18 may form an illuminator housing for enclosure of light emitting diode 12, or alternatively, may simply be positioned adjacent light emitting diode 12 to provide an interface between light guides 14, 16 and the emission side of the light emitting diode. Alternatively, rather than light guide fixture 18, a suitable spacer, clamp, or the like may be used to properly position light guides 14, 16 relative to light emitting diode 12. Importantly, however, the positioning of light guides 14, 16 is at offset locations relative to the center axis of light emitting diode 12 so as to take advantage of the peak luminous intensity angle of light emitting diode 12.

Figure 4:
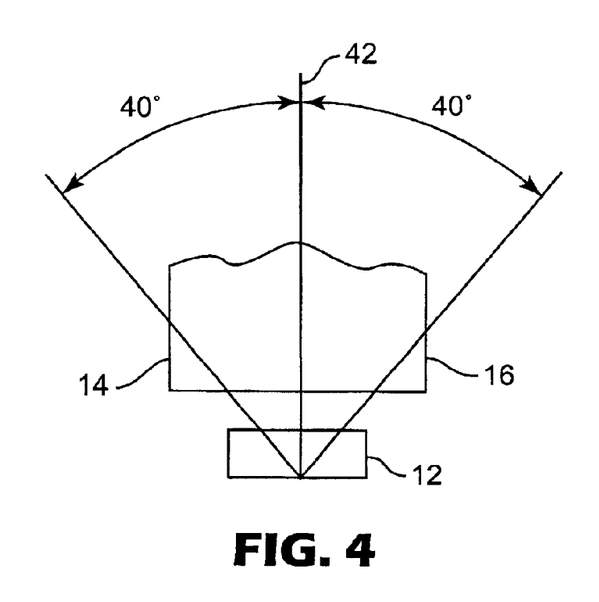
FIG. 4 can be viewed as either a side view or a top view of light guides positioned relative to a light emitting diode.

FIG. 4 can be viewed as either a side view or a top view of light guides positioned relative to a light emitting diode. As shown, the positioning of light guides 14, 16 is at offset locations relative to the center axis 42 of light emitting diode 12. As can be appreciated by FIG. 4, if light guides 14, 16 are positioned further away from light emitting diode 12, the distance of the centers of the light guides to the center axis 42 increases. In general, the optimal positioning of the light guides, when taking into account only the peak luminous intensity angle, can be defined as:

$$X=Y\tan(\Phi),$$

X defines the distance of the center of the light guide to the center axis 42 of the light emitting diode 12, Y defines the distance from the effective point source within light emitting diode 12 to a plane defined by the cross-sectional side of the light guide into which light is to be transmitted, and Φ defines the peak luminous intensity angle. Of course, some slight amount of variation can be tolerated. For example, the cross-sectional centers may deviate slightly from the peak luminous intensity angle, but that would also result in reduced coupling efficiency.

Referring again to FIG. 4, in one embodiment, light guides 14, 16 have cross-sectional diameters of approximately 7 millimeters. Thus, if light guides 14, 16 are placed directly beside one another such that the side of the light guides follow the center axis 42 of light emitting diode 12, and the peak luminous angle Φ=40 degrees, then the optimal positioning of light guides 14, 16 taking into account only the peak luminous intensity angle Φ would be a distance Y=X/tan(Φ) away from the effective point source within light emitting diode 12. In other words Y=3.5/tan(40)=4.17 millimeters.

However, as light guides are positioned larger distances from the light emitting diode, the flux into any given light guide also decreases, even if the light guide is properly positioned along the peak luminous intensity angle. Thus, actual optimal performance may be achieved by both minimizing the distance Y and positioning the center of the light guides along the peak luminous intensity angle Φ. In some cases, optimal performance can be achieved by reducing the distance Y at the expense of optimal positioning of the centers of the light guides along the peak luminous intensity angle Φ. In other words, it may be desirable to position the light guides closer to the light emitting diode even if doing so causes the centers of the light guides to deviate from the peak luminous intensity angle Φ. For example, if the light guides have relatively large diameters, positioning them more closely to the light emitting diode may cause the cross-sectional centers of the light guides to deviate from the peak luminous intensity angle. This is acceptable, of course, if it causes more light to be captured by the light guides.

Figure 5:
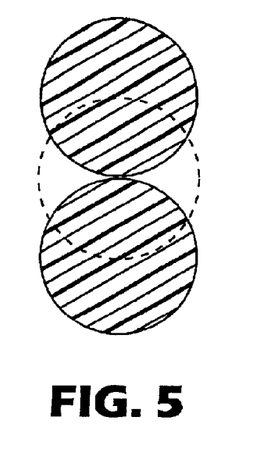
FIGS. 5–8 are cross-sectional views illustrating embodiments wherein the light guides are positioned along the peak luminous intensity angle of a light emitting diode.
Figure 6:
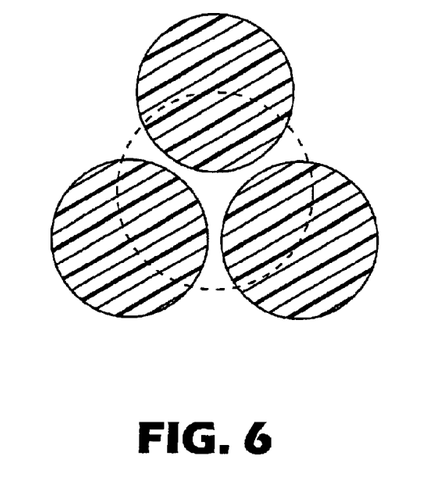
Figure 7:
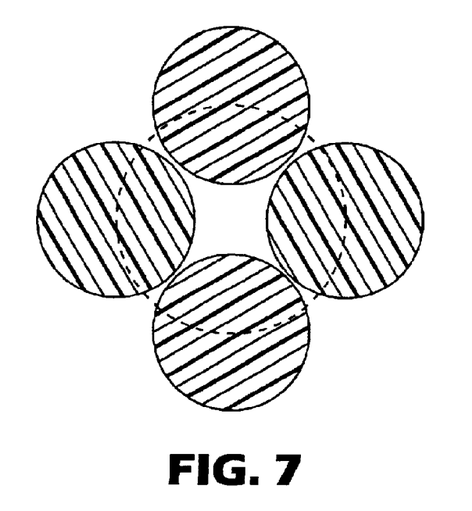
Figure 8:
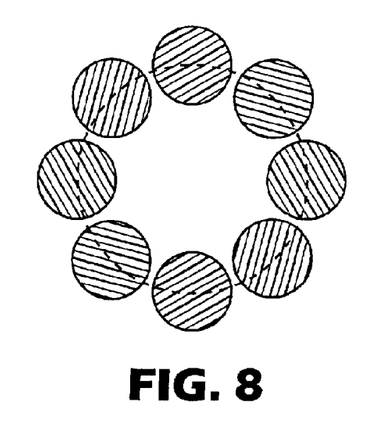

Any number of light guides may be positioned along the peak luminous intensity angle, or more generally, at offset locations relative to the center axis of the light emitting diode in accordance with the invention. FIGS. 5–8 are cross-sectional views illustrating embodiments wherein the light guides are positioned along the peak luminous intensity angle (indicated by the dotted line). FIG. 5 illustrates two light guides, FIG. 6 illustrates three light guides, FIG. 7 illustrates four light guides, and FIG. 8 illustrates eight light guides. As shown, the cross sectional centers of the light guides correspond to the peak luminous intensity angle. As described above, optimal performance may actually be achieved by minimizing the distance of the light guides from the light emitting diode. In any case, however, the light guides are positioned at offset locations relative to the center axis of the light emitting diode. Many other configurations are also contemplated, including configurations having any number of light guides, and configurations in which the light guides are not positioned symmetrically around a peak luminous intensity angle. For example, in FIG. 5, the light guides are illustrated as being on opposite sides of the center axis, but could alternatively be individually positioned at any offset location relative to the center axis of the light emitting diode. In addition, light guides having various different cross-sectional diameters could be positioned at offset locations relative to a center axis of the same light emitting diode.

Figure 9:
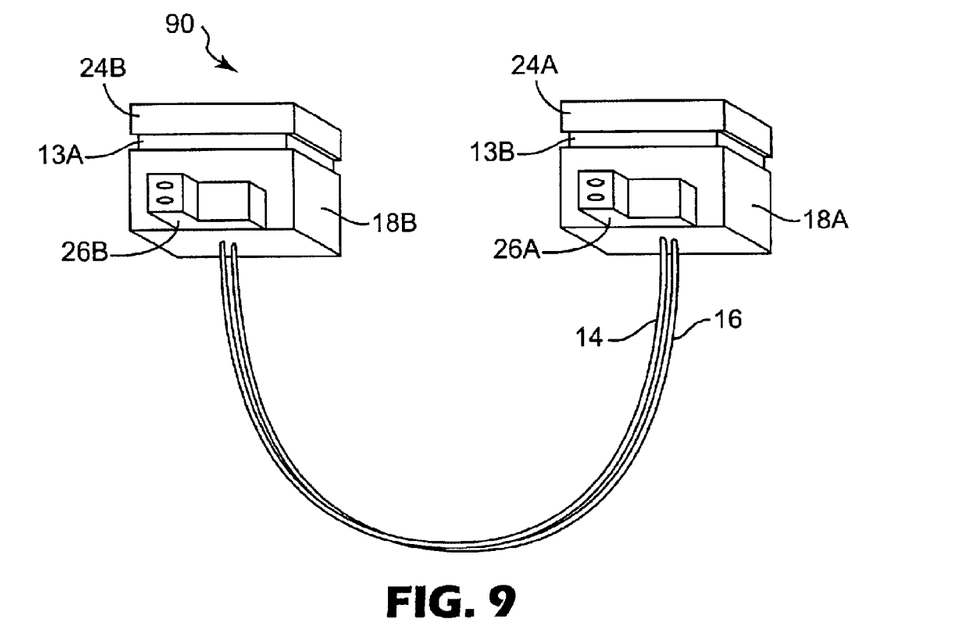
FIG. 9 is a top perspective view of light guides illuminated by light emitting diodes on both ends.

FIG. 9 is a top perspective view of light guides illuminated by light emitting diodes on both ends. Illumination device 90 includes a first light emitting diode, a second light emitting diode, and a number of light guides 14, 16. For example, the light emitting diodes may reside on first and second plates 13A, 13B, although the invention is not limited in that respect. Each of the number of light guides 14, 16 has two ends, and each end of each of the number of light guides is positioned at offset locations relative to the center axis of one of the light emitting diodes. Again, although illustrated as including two light guides 14, 16, an illumination device according to the invention may include any number of light guides positioned at offset locations relative to the center axis of the light emitting diodes.

Illumination device 90 may also include first and second heat sinks 24A, 24B to dissipate heat away from the first and second light emitting diodes. In addition, illumination device 90 may include first and second connectors 26A, 26B coupled respectively to the first and second light emitting diodes. For example, first and second connectors 26A, 26B may be used to connect the light emitting diodes to one or more power supplies (not shown).

First and second light guide fixtures 18A, 18B may be used to properly position the ends of light guides 14, 16 relative to the light emitting diodes. For example, light guide fixtures 18A, 18B can be formed with holes for mating with each respective end of light guides 14, 16. Using light guide fixtures 18A, 18B, the respective ends of light guides 14, 16 can be positioned relative to the light emitting diodes at offset locations relative to a center axis of the light emitting diodes. In this manner, illumination device 90 can take advantage of the batwing radiation patterns of the light emitting diodes.

Because illumination device 90 utilizes a light emitting diode at each end of light guides 14, 16, the light guides may be illuminated with greater intensity. In many cases, this can improve the visual effect. Importantly, however, the end of each light guide is positioned at an offset location relative to a center axis of the respective light emitting diode so that an angularly displaced peak of the radiation pattern of each light emitting diode is captured by each of the light guides.

The use of light emitting diodes according to the invention provides advantages over other light sources. In particular, light emitting diodes may be generally better suited for illumination of light guides than other non-point like light sources. In addition, the use of light emitting diodes as opposed to filament light sources, incandescent light sources, or other light sources can reduce power consumption. Moreover, light emitting diodes can be more reliable than other light source alternatives, and may have longer lifespans that other light source alternatives.

The invention may also provide advantages by illuminating a number of light guides with a light emitting diode. The invention may avoid the use of costly connectors or splitters often used in more conventional light guide bundles. Indeed, the need to bundle light guides to provide lighting via a single illuminator can be avoided altogether. Rather, each of a number of light guides may be individually positioned relative to a light emitting diode using a simple light guide fixture formed to mate with the light guides in a manner that properly positions the light guides.

The invention can also produce more uniform lighting by illuminating a number of light guides with the same illuminator or illuminators. Intensity variation between different light emitting diodes can be relatively large. Indeed, some light emitting diodes are sold at higher costs when the amount of acceptable variation in light output between different light emitting diodes is minimized. The invention, however, can utilize the same light emitting diode(s) to illuminate a number of light guides in a substantially uniform manner. Thus, even the relatively lower cost light emitting diodes can be used to illuminate multiple light guides substantially uniformly.

The invention may also avoid the use of corrective optics. Because conventional teaching has viewed angular displacement of peak radiation intensity as a problem, corrective optics have been developed to fix this perceived problem. These corrective optics typically redistribute the light of an angularly displaced radiation pattern to provide a radiation pattern that has a peak at or near the center axis of the light emitting diode. Because the invention effectively utilizes the angularly displaced radiation pattern, however, the invention may avoid the need for corrective optics.

Figure 10:
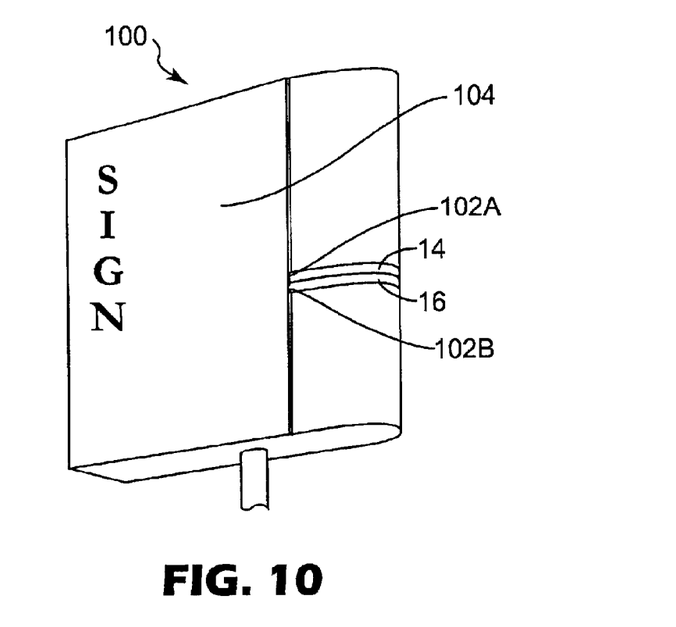
FIG. 10 is a perspective view illustrating an example sign according to the invention.

The invention can be used wherever lighting is desirable. One particular exemplary application of the invention is in a sign. FIG. 10 illustrates one example sign 100. Sign 100 utilizes illumination device 90 as illustrated in FIG. 9. For example, sign 100 may be formed with holes 102A, 102B through which light guides 14, 16 protrude. The light emitting diodes residing on plates 13A, 13B (FIG. 9), the light guide fixtures 18A, 18B, the first and second heat sinks 24A, 24B, and the first and second connectors 26A, 26B may be housed within frame 104 of sign 100. Some embodiments may utilize a number of illuminator devices like illumination device 90 of FIG. 9. For example, a sign may utilize a number of illuminator devices, each having a pair of light guides like light guides 14, 16.

Light guides 14, 16 may include notches, coating, or the like to provide directional side lighting. In some embodiments, light guide 14 can direct light in a different direction than light guide 16. In other words, the two different light guides may provide directional lighting in different directions. For example, light guide 16 may direct light downward, toward persons close to sign 100, and light guide 14 may direct light outward, toward persons a significant distance from sign 100. This can be particularly useful for signs used in retail store checkout lanes. For example, light guide 16 may need to be more conspicuous to persons close to the sign, such as customers wondering whether the particular checkout lane associated with sign 100 is open. Light guide 14 may need to be more conspicuous to persons far away from the sign, such as managers needing to be notified of a problem in the checkout lane associated with sign 100. In still other embodiments, the first light guide and the second light guide may provide different colors of light, e.g., via the use of one or more filters or different filtering material within the respective light guides or coated on the respective light guides. Alternatively, if more than one illumination device having a pair of light guides is used, the different illumination devices may provide lighting with different colors.

In accordance with the invention, light guides can be properly positioned and then illuminated. Properly positioning the light guides according to the invention can improve the visual effect. For example, as described above, the light guides can be positioned at offset locations relative to a center axis of a light emitting diode so that the light guides capture angularly displaced light at or near the peak luminous intensity angle. In one embodiment, the light guides are positioned such that the cross-sectional centers of the light guides substantially correspond to locations of the maximum luminous intensity of the radiation pattern of the light emitting diode. In other embodiments, however, the distance of the light guides to the light emitting diode is substantially minimized. In that case, the cross-sectional centers of the light guides may deviate slightly from the location of the maximum luminous intensity of the radiation pattern of the light emitting diode. Importantly, however, the light guides are positioned at offset locations relative to the center axis of the light emitting diode. This can ensure that the light guides capture as much light as possible, which can in turn enhance the visual effect.

Many implementations and embodiments of the invention have been described. For instance, an illumination device that includes light guides illuminated by a light emitting diode in a manner that takes advantage of radiation patterns having angularly displaced maximum luminous intensity have been described for use in any lighting system. Nevertheless, it is understood that various modifications can be made without departing from the spirit and scope of the invention. For example, the invention may be used in any application where lighting is desirable, including such applications as functional or decorative lighting for buildings, water fountains, instrument panels of vehicles, aircrafts or watercrafts, Christmas tree decorations, isle lighting for theaters or the like, neon-like light guide signs, turn-signals or brake lights on vehicles or any other application where lighting is desirable. Accordingly, other implementations and embodiments are within the scope of the following claims.

What is claimed is:

1. An illumination device comprising:
   a light emitting diode that emits a radiation pattern, wherein a maximum luminous intensity of the radiation pattern is displaced relative to a center axis of the light emitting diode; and
   a number of light guides positioned to be illuminated by the light emitting diode, each light guide positioned at offset locations relative to the center axis of the light emitting diode wherein each light guide is positioned such that a cross-sectional center of each light guide substantially corresponds to locations of the maximum luminous intensity of the radiation pattern of the light emitting diode.

2. The illumination device of claim 1, wherein each light guide provides directional side lighting in a unique direction.

3. The illumination device of claim 2, wherein the locations of the maximum luminous intensity of the radiation pattern of the light emitting diode are substantially rotationally symmetric around the center axis of the light emitting diode.

4. The illumination device of claim 1, wherein the number of light guides includes two light guides.

5. The illumination device of claim 1, further comprising a tight guide fixture formed to mate with the light guides, wherein the light guide fixture positions the light guides at the offset locations relative to the center axis of the light emitting diode.

6. The illumination device of claim 5, wherein the light guide fixture is positioned adjacent the light emitting diode.

7. The illumination device of claim 5, wherein the light guide fixture is a housing that houses the light emitting diode.

8. The illumination device of claim 1, wherein at least one of the light guides provides directional side lighting in a first direction and wherein at least another of the light guides provides directional side lighting in a second direction.

9. An illumination device comprising:
   a light emitting diode that emits a radiation pattern, wherein a maximum luminous intensity of the radiation pattern is displaced relative to a center axis of the light emitting diode; and
   at least one light guide positioned to be illuminated by the light emitting diode, the light guide positioned at an offset location relative to the center axis of the light emitting diode, wherein the light guide is positioned such that a cross-sectional center of the light guide substantially corresponds to a location of the maximum luminous intensity of the radiation pattern of the light emitting diode.

10. The illumination device of claim 9, further comprising a plurality of light guides positioned such that cross-sectional centers of each of the light guides substantially corresponds to locations of the maximum luminous intensity of the radiation pattern of the light emitting diode, wherein each of the plurality of light guides provides directional side lighting in a unique direction.

11. The illumination device of claim 9, further comprising a light guide fixture formed to mate with the light guide, wherein the light guide fixture positions the light guide at the offset location relative to the center axis of the light emitting diode.

12. The illumination device of claim 11, wherein the light guide fixture is positioned adjacent the light emitting diode.

13. The illumination device of claim 11, wherein the light guide fixture is a housing that houses the light emitting diode.

14. An illumination device comprising:
   a light emitting diode that emits a radiation pattern wherein a maximum luminous intensity of the radiation pattern is displaced relative to a center axis of the light emitting diode;
   a light guide fixture, the light diode fixture formed to mate with light guides,
   a first light guide having a first end mated with the light guide fixture, wherein the first end of the first light guide is positioned at a first offset location relative to the center axis of the light emitting diode, wherein the first end of the first light guide is positioned such that a cross-sectional center of the first light guide substantially corresponds to a first location of the maximum luminous intensity of the radiation pattern of the light emitting diode,
   a second light guide having a first end mated with the light guide fixture, wherein the first end of the second light guide is positioned at a second offset location relative to the center axis of the light emitting diode, wherein the first end of the second light guide is positioned such that a cross-sectional center of the second light guide substantially corresponds to a second location of the maximum luminous intensity of the radiation pattern of the light emitting diode.

15. The illumination device of claim 14, wherein each of the first and second light guides provide directional side lighting in a unique direction.

16. The illumination device of claim 15, wherein the first light guide provides directional side lighting in a first direction, and wherein the second light guide provides directional side lighting in a second direction.

17. The illumination device of claim 14, wherein the first and second locations of the maximum luminous intensity of the radiation pattern of the light emitting diode are substantially rotationally symmetric around the center axis of the light emitting diode.

18. The illumination device of claim 14, wherein the light guide fixture is positioned adjacent the light emitting diode.

19. The illumination device of claim 14, wherein the light guide fixture is a housing that houses the light emitting diode.

20. The illumination device of claim 14, wherein the light emitting diode is a first light emitting diode and the light guide fixture a first light guide fixture, the illumination device further comprising:

a second light emitting diode that emits a radiation pattern wherein a maximum luminous intensity of the radiation pattern of the second light emitting diode is displaced relative to a center axis of the second light emitting diode;

a second light guide fixture, the second light guide fixture formed to mate with light guides, wherein the first light guide has a second end mated with the second light guide fixture, wherein the second end of the first light guide is positioned at a first offset location relative to the center axis of the second light emitting diode, and wherein the second light guide has a second end mated with the second light guide fixture, wherein the second end of the second light guide is positioned at a second offset location relative to the center axis of the second light emitting diode.

21. The illumination device of claim 20, wherein the first end of the first light guide is positioned such that a cross-sectional center of the first light guide substantially corresponds to a first location of the maximum luminous intensity of the radiation pattern of the first light emitting diode, wherein the first end of the second light guide is positioned such that a cross-sectional center of the second light guide substantially corresponds to a second location of the maximum luminous intensity of the radiation pattern of the first light emitting diode, wherein the second end of the first light guide is positioned such that a cross-sectional center of the first light guide substantially corresponds to a first location of the maximum luminous intensity of the radiation pattern of the second light emitting diode, and wherein the second end of the second light guide is positioned such that a cross-sectional center of the second light guide substantially corresponds to a second location of the maximum luminous intensity of the radiation pattern of the second light emitting diode.

22. The illumination device of claim 20, wherein the first light guide fixture is positioned adjacent the first light emitting diode, and wherein the second light guide fixture is positioned adjacent the second light emitting diode.

23. The illumination device of claim 20, wherein the first light guide fixture is a housing that houses the first light emitting diode, and wherein the second light guide fixture is a housing that houses the second light emitting diode.

24. An illumination device comprising:

a light emitting diode that emits a radiation pattern, wherein a maximum luminous intensity of the radiation pattern is displaced relative to a center axis of the light emitting diode;

a number of light guides; and means for positioning each light guide at offset locations relative to the center axis of the light emitting diode such that a cross sectional center of each light guide substantially corresponds to locations of the maximum luminous intensity of the radiation pattern of the light emitting diode.

25. The illumination device of claim 24, wherein each of the light guides provide directional side lighting in a unique direction.

26. A sign comprising:

a frame;

a light emitting diode that emits a radiation pattern wherein a maximum luminous intensity of the radiation pattern is displaced relative to a center axis of the light emitting diode, wherein the light emitting diode is housed within the frame; and a number of light guides positioned to be illuminated by the light emitting diode, each light guide positioned at offset location is relative to the center axis of the light emitting diode, wherein the frame is formed with holes and the each light guide protrudes through at least one of the holes, wherein each light guide is positioned such that a cross-sectional center of each light guide substantially corresponds to locations of the maximum luminous intensity of the radiation pattern of the light emitting diode.

27. The sign of claim 26, wherein the locations of the maximum luminous intensity of the radiation pattern of the light emitting diode are substantially rotationally symmetric around the center axis of the light emitting diode.

28. The sign of claim 26, wherein each light guide provides directional side lighting in a unique direction.

29. A sign comprising:

a frame;

a first light emitting diode that emits a radiation pattern wherein a maximum luminous intensity of the radiation patterns is displaced relative to a center axis of the first light emitting diode;

a first light guide fixture, the first light guide fixture formed to mate with light guides, wherein the first light emitting diode and the first light guide fixture are housed in the frame;

a first light guide having a first and mated with the first light guide fixture, wherein the first end of the first light guide is positioned at a first offset location relative to the center axis of the light emitting diode;

a second light guide having a first end mated with the first light guide fixture, wherein the first end of the second light guide is positioned at a second offset location relative to the center axis of the first light emitting diode;

a second light emitting diode that emits a radiation pattern wherein a maximum luminous intensity of the radiation pattern is displaced relative to a center axis of the second light emitting diode; and a second light guide fixture, the second light guide fixture formed to mate with light guides, wherein the fist light guide has second end mated with the second light guide fixture, wherein the second end of the first light guide is positioned at a first offset location relative to the center axis of the second light emitting diode, wherein the second light guide has a second end mated with the second light guide fixture, wherein the second end of the second light guide is positioned at a second offset location relative to the center axis of the second light emitting diode, wherein the frame is formed with holes and wherein the first and second light guides pass through the holes, and wherein the first and second light guides are positioned such that a cross-sectional center of each light guide substantially corresponds to locations of the maximum luminous intensity of the radiation pattern of each of the light emitting diodes.

30. The sign of claim 29, wherein each of the light guides provide directional side lighting in a unique direction.

31. The sign of claim 30, wherein the locations of the maximum luminous intensity of he radiation pattern of the light emitting diode are substantially rotationally symmetric around the center axis of the light emitting diode.

32. A method comprising:

positioning a number of light guides next to a light emitting diode that emits a radiation pattern wherein a maximum luminous intensity of the radiation pattern is displaced relative to a center axis of the light emitting diode each light guide being positioned such that a cross-sectional center of each light guide substantially corresponds to locations of the maximum luminous intensity of the radiation pattern of the light emitting diode; and illuminating the light guides with the light emitting diode.

* * * * *

UNITED STATES PATENT AND TRADEMARK OFFICE
CERTIFICATE OF CORRECTION

PATENT NO. : 6,957,904 B2
DATED : October 25, 2005
INVENTOR(S) : Randall

It is certified that error appears in the above-identified patent and that said Letters Patent is hereby corrected as shown below:

Title page,
Item [56], References Cited, U.S. PATENT DOCUMENTS, after "6,272,269 B1" insert -- * --.
OTHER PUBLICATIONS,
"Secondary Optics" reference, after "Technical" delete "Services" and insert -- Service --.

Column 9,
Line 48, after "a" delete "tight" and insert -- light --.

Column 10,
Line 29, after "the light" delete "diode" and insert -- guide --.

Column 11,
Line 57, after "a" delete "cross sectional" and insert -- cross-sectional --.

Column 12,
Line 7, after "offset" delete "location is" and insert -- locations --.
Line 25, delete "patterns" before "is" and insert -- pattern --.
Line 31, after "a first" delete "and" and insert -- end --.
Line 47, after "wherein the" delete "fist" and insert -- first --.
Line 47, after "has" insert -- a --.

Column 13,
Line 8, after "diode" insert -- , --.

Signed and Sealed this

Seventeenth Day of January, 2006

JON W. DUDAS
*Director of the United States Patent and Trademark Office*